United States Patent
Komatsu et al.

(10) Patent No.: US 7,660,101 B2
(45) Date of Patent: Feb. 9, 2010

(54) ELECTROLYTIC CAPACITOR AND ELECTROLYTE SOLUTION FOR USE IN AN ELECTROLYTIC CAPACITOR

(75) Inventors: Akihiko Komatsu, Ina (JP); Toshikazu Iida, Ina (JP); Takashi Nozawa, Ina (JP); Taketo Matsuzawa, Ina (JP); Tetsushi Ogawara, Ina (JP); Shigeru Uzawa, Ina (JP)

(73) Assignee: Rubycon Corporation, Ina-shi, Nagano (JP)

( * ) Notice: Subject to any disclaimer, the term of this patent is extended or adjusted under 35 U.S.C. 154(b) by 283 days.

(21) Appl. No.: 11/729,052

(22) Filed: Mar. 27, 2007

(65) Prior Publication Data

US 2007/0171595 A1 Jul. 26, 2007

Related U.S. Application Data (62) Division of application No. 10/500,426, filed on Jun. 28, 2004, now Pat. No. 7,279,117.

(51) Int. Cl.
  *H01G 9/02* (2006.01)
  *H01G 9/145* (2006.01)
(52) U.S. Cl. .................... 361/512; 361/508
(58) Field of Classification Search ............... 361/503, 361/508, 511, 512
See application file for complete search history.

(56) References Cited

U.S. PATENT DOCUMENTS

| | | | | |
|---|---|---|---|---|
| 5,629,829 A | * | 5/1997 | Ikeya | 361/505 |
| 5,847,919 A | * | 12/1998 | Shimizu et al. | 361/517 |
| 6,285,543 B1 | | 9/2001 | Komatsu et al. | |
| 6,288,889 B1 | | 9/2001 | Komatsu et al. | |
| 6,307,732 B1 | | 10/2001 | Tsubaki et al. | |
| 6,349,028 B1 | | 2/2002 | Komatsu | |
| 6,493,211 B1 | | 12/2002 | Sugiyama et al. | |
| 2004/0245105 A1 | | 12/2004 | Komatsu et al. | |

FOREIGN PATENT DOCUMENTS

| | | |
|---|---|---|
| EP | 1 063 662 | 12/2000 |
| JP | 59-15374 | 1/1984 |
| JP | 62-145713 | 6/1987 |
| JP | 62-145714 | 6/1987 |
| JP | 63-14862 | 1/1988 |
| JP | 1-143315 | 6/1989 |
| JP | 9-115782 | 5/1997 |
| JP | 9-186052 | 7/1997 |
| JP | 2000-173863 | 6/2000 |
| JP | 2000-173872 | 6/2000 |
| JP | 2001-291643 | 10/2001 |
| WO | WO 00/33337 | 6/2000 |
| WO | WO 00/33338 | 6/2000 |
| WO | WO 00/55876 | 9/2000 |

\* cited by examiner

*Primary Examiner*—Eric Thomas
(74) *Attorney, Agent, or Firm*—Merchant & Gould P.C.

(57) ABSTRACT

The electrical properties and high-temperature characteristics of an electrolytic capacitor are rendered satisfactory by addition of a compound with an unsaturated bond-containing chain which serves to absorb hydrogen gas generated by reaction between the aluminum electrode foil and the electrolyte solution. The electrolytic capacitor contains the unsaturated compound which allows hydrogen addition, or the electrolytic solution, which comprises a solvent composed of 10-80 wt % of an organic solvent and 90-20 wt % water and at least one electrolyte selected from the group consisting of carboxylic acids or their salts and inorganic acids or their salts, also comprises one or more unsaturated compounds which are water-soluble or soluble in polar and protic polar solvents.

14 Claims, 1 Drawing Sheet

Fig.1

ELECTROLYTIC CAPACITOR AND ELECTROLYTE SOLUTION FOR USE IN AN ELECTROLYTIC CAPACITOR

This application is a Divisional Application of U.S. Ser. No. 10/500,426, filed Jun. 28, 2004, which issued as U.S. Pat. No. 7,279,117 on Oct. 9, 2007, which application(s) are incorporated herein by reference.

FIELD OF THE INVENTION

The present invention relates to an electrolytic capacitor, and more specifically, it relates to an electrolyte solution for use in an electrolytic capacitor and an electrolytic capacitor, particularly an aluminum electrolytic capacitor, having a low impedance and excellent low temperature stability, having a reduced pressure increase inside the capacitor, due to hydrogen gas generated in high-temperature environments, and having a satisfactory usable life.

BACKGROUND OF THE INVENTION

Capacitors are common electrical parts which are primarily used for power supply circuits or digital circuit noise filters in various types of electrical and electronic products. Capacitors are largely classified into electrolytic capacitors and non-electrolytic capacitors (ceramic capacitors, film capacitors, etc.).

A wide variety of electrolytic capacitors are currently used, such as aluminum capacitors, wet tantalum electrolytic capacitors, and the like. Because aluminum electrolytic capacitors are able to provide a particularly excellent effect of the invention, the following explanation of the invention will be particularly focused on aluminum electrolytic capacitors, but the invention may be applied generally to all types of electrolytic capacitors without limitation.

A valve metal is used as the electrode material for an electrolytic capacitor and, in an aluminum electrolytic capacitor, aluminum is used as the electrode material. The basic structure of an electrolytic capacitor comprises an element comprising electrodes of prescribed shape having a dielectric oxide film on the surface (etched, if necessary, to increase the surface area and control capacitance) as the anode and cathode, arranged in a mutually opposing manner, with an electrolyte solution-holding separator lying between them. The element of the electrolytic capacitor is sealed into a package. An electrolytic capacitor element may have a wound structure or a laminated structure.

In an electrolytic capacitor, such as that described above, the properties of the electrolyte solution constitute a major factor determining the performance of the electrolytic capacitor. Particularly, with the downsizing of electrolytic capacitors in recent years, anode foils or cathode foils with higher etching factors have been used and the resistivities of the capacitor have increased and, therefore, electrolyte solutions with lower resistivity and higher conductivity are required to be use in the electrolytic capacitor.

A conventional electrolytic capacitor electrolyte solution generally comprises a solution of a carboxylic acid, such as adipic acid or benzoic acid, or its ammonium salt as the electrolyte dissolved in a solvent composed of ethylene glycol (EG) as the main solvent with water added to about 15 wt %. Such electrolyte solutions have resistivities of about 1.5Ω·m (150 Ω·cm).

On the other hand, the capacitor is required to have a low impedance (Z) for the purpose of achieving sufficient performance. The impedance is determined by several factors and, for example, it is lowered by increasing the electrode area of the capacitor and, therefore, large-sized capacitors inherently provide lower impedance. Improving the separator is another approach to lowering the impedance. However, the resistivity of the electrolyte solution is the major factor governing the impedance, especially in smaller capacitors.

Recently, low-resistivity electrolyte solutions have been developed using aprotic organic solvents such as GBL (γ-butyrolactone). (See, for example, Japanese Unexamined Patent Publication SHO No. 62-145713, Japanese Unexamined Patent Publication SHO No. 62-145714 and Japanese Unexamined Patent Publication SHO No. 62-145715). However, capacitors using such aprotic electrolyte solutions have vastly inferior impedances compared to solid capacitors employing electron conductors with resistivity of 1.0Ω·cm or below.

It is currently the situation that aluminum electrolytic capacitors, which employ electrolyte solutions, have poor low temperature stability and a rather large −40° C. impedance/20° C. impedance ratio Z(−40° C.)/Z(20° C.) of about 40 at 100 kHz. In light of this situation, it has been desirable to provide an aluminum electrolytic capacitor with low impedance, low resistivity and excellent low temperature stability.

Moreover, the water used as part of the solvent in an aluminum electrolytic capacitor electrolyte solution is a chemically active substance with respect to the aluminum of the anode foil or cathode foil. It therefore reacts with the anode foil or cathode foil to generate hydrogen gas, and this raises the pressure in the capacitor and increases the stress on the capacitor element, thereby causing deformation or breakage of the wound structure; this may promote fly out of the electrolyte solution to the exterior or activate the safety vent, thereby significantly altering the characteristics. In order to eliminate the problem of generated hydrogen gas, it has been attempted in the past to absorb generated hydrogen gas in an electrolytic capacitor load test or the like. For example, Japanese Examined Patent Publication SHO No. 59-15374 discloses an electrolyte solution for use in an electrolytic capacitor, which is obtained by adding a carboxylic acid and carboxylic acid ammonium salt to a solvent containing ethylene glycol added with 5-20 wt % water to prepare a buffer solution, and then further adding 0.05-3 wt % p-nitrophenol. By using this electrolyte solution it is possible to provide an electrolytic capacitor with limited boehmite production and little hydrogen gas generation on the electrode foil surface together with an enhanced low temperature stability and a long usable life.

Also, Japanese Examined Patent Publication SHO No. 63-14862 discloses an electrolyte solution for use in an electrolytic capacitor capable of exhibiting an excellent corrosion inhibiting effect for cleaning with halogenated hydrocarbons, wherein o-nitroanisole is added to an electrolyte solution prepared by dissolving an organic acid, inorganic acid or its salt as a solute in a solvent consisting mainly of ethylene glycol. It is stated in this publication that o-nitroanisole used as a corrosion inhibitor exhibits a hydrogen gas-absorbing effect, thereby absorbing the hydrogen gas generated inside the electrolytic capacitor during use and minimizing valve-opening accidents or changes in capacitance.

However, research by the present inventors has shown that although p-nitrophenol or o-nitroanisole exhibit an initial hydrogen gas absorbing effect in an electrolyte solution for use in an electrolytic capacitor with low water concentration, such as are commonly used in the prior art, they are unable to exhibit and maintain satisfactory hydrogen gas absorbing effects when the amount of water in the solvent of the electrolyte solution is 20 wt % or greater, or when the electrolytic capacitor is used for a prolonged period in a high-temperature environment.

In Japanese Unexamined Patent Publication No. 2000-173872, the present inventors have already disclosed that the aforementioned object can be achieved by an electrolyte solution for use in an electrolytic capacitor comprising nitrophenol, nitrobenzoic acid, dinitrobenzoic acid, nitroacetophenone or nitroanisole in an electrolyte solution wherein the solvent is composed of 20-80 wt % of an organic solvent and 80-20 wt % water. However, these differ from the compounds of the invention which have unsaturated bond-containing chains.

It is an object of the present invention to overcome the aforementioned drawbacks associated with the prior art, and to provide an electrolyte solution for use in an electrolytic capacitor having low impedance and excellent low temperature stability, as represented by the impedance ratio at a low temperature and an ordinary temperature, and a satisfactory usable life, and being capable of exhibiting an excellent hydrogen gas-absorbing effect even when an electrolyte solution employing a solvent mixture with a high water content is used or when the electrolytic capacitor is used in a high-temperature environment, as well as an electrolytic capacitor employing the electrolyte solution.

It is another object of the invention to provide an electrolytic capacitor wherein the capacitor element contains a solvent-soluble compound with an unsaturated bond-containing chain which can undergo a hydrogen addition reaction in an electrolyte solution composed of at least 20 wt % water in the solvent composition.

SUMMARY OF THE INVENTION

As a result of much diligent research directed toward achieving the objects stated above, the present inventors have completed the present invention upon finding that said objects can be achieved by the addition of a compound with an unsaturated bond-containing chain.

The present invention therefore provides, according to one aspect thereof, an electrolyte solution for use in an electrolytic capacitor characterized by comprising a solvent-soluble compound having an unsaturated bond-containing chain which can undergo hydrogen addition in an electrolyte solution which comprises a solvent composed of 10-80 wt % of an organic solvent and 90-20 wt % water and at least one type of electrolyte selected from the group consisting of carboxylic acids or their salts and inorganic acids or their salts.

The role, function and effect of the compound with an unsaturated bond-containing chain in the electrolyte solution for use in an electrolytic capacitor of the invention are conjectured to be as follows.

Hydrogen gas generated by a hydration reaction between an aluminum electrode foil and a water solvent increases the pressure inside the capacitor and leads to several phenomena; for example, it produces stress in the capacitor element and thereby causes deformation or breakage of the structure of the element, or promotes fly out of the electrolyte solution to the exterior or activates the safety vent, thereby significantly altering the characteristics of the capacitor. The role of the compound with an unsaturated bond-containing chain, that can undergo a hydrogen addition reaction, is to inhibit these phenomena. The compound with an unsaturated bond-containing chain that can undergo hydrogen addition reaction efficiently absorbs hydrogen generated inside the capacitor, thereby inhibiting deterioration in the characteristics of the capacitor. The process is a chemical reaction, and specifically a hydrogen addition reaction.

The absorption of hydrogen, which inhibits a pressure increase inside the capacitor, occurs during a hydrogen addition reaction due to cleavage of the unsaturated bond of the compound with an unsaturated bond-containing chain. The compound with an unsaturated bond-containing chain consumes hydrogen, for example, by conversion from an alkene as an unsaturated hydrocarbon to an alkane as a saturated hydrocarbon, or from an imine to an amine. Here it is important that the compound with an unsaturated bond-containing chain is evenly dispersed in the electrolyte solution and for the compound to be capable of absorbing hydrogen.

When the compound with an unsaturated bond-containing chain is added to the electrolyte solution of the invention, it is preferably used in an amount of 0.1-10 wt % based on the total weight of the electrolyte solution.

The organic solvent used together with the water to form the mixed solvent is preferably a protic solvent, an aprotic solvent, or a mixture thereof. Specifically, a protic solvent or an aprotic solvent may be used alone or, if necessary, two or more different ones may be used in any desired combination. The protic solvent will preferably be an alcohol compound, and the aprotic solvent will preferably be a lactone compound.

As carboxylic acids and their salts to be used as electrolytes for the electrolyte solution of the invention there may be preferably mentioned one or more selected from the group consisting of monocarboxylic acids, dicarboxylic acids, tricarboxylic acids, hydroxyl group- and other functional group-containing carboxylic acids, saturated carboxylic acids and unsaturated carboxylic acids, such as formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, as well as their derivatives and their ammonium salts, sodium salts, potassium salts, amine salts, alkylammonium salts, etc.

Likewise, as inorganic acids and their salts to be used as electrolytes there may be preferably mentioned one or more selected from the group consisting of inorganic acids and alkyl group- or other carbon chain-containing inorganic acids, such as phosphoric acid, phosphorous acid, hypophosphorous acid, boric acid, sulfaminic acid and alkylphosphoric acids, as well as their ammonium salts, sodium salts, potassium salts, amine salts, alkylammonium salts, etc. The electrolytes of the invention may also include if necessary, in addition to the compound with an unsaturated bond-containing chain, additives selected from among the following groups: (1) chelate compounds (2) saccharides, (3) hydroxybenzyl alcohols and/or L-glutamic acid diacetate or their salts, (4) gluconic acid and/or gluconic lactone and (5) nitro or nitroso compounds. Such additives may be used alone or in any desired combinations of two or more.

According to another aspect of the invention, the results of further study based on the experimental findings and results described above indicate that, for an electrolytic capacitor comprising an electrolyte solution wherein the solvent is composed of 10-80 wt % of an organic solvent and 90-20 wt % water, the compound with an unsaturated bond-containing chain does not necessarily have to be present in the electrolyte solution, as an additional effect is afforded by a construction in which it is contained elsewhere than in the electrolyte solution.

For example, an adequate hydrogen-adsorbing and hydrogen addition reaction effect is exhibited even if the compound with an unsaturated bond-containing chain is present not in the electrolyte solution but in the hydrogen-generating section of the capacitor, i.e. the electrode foil surface or its proximity, or in the separator. Also, a similar effect is exhibited if the compound with an unsaturated bond-containing chain is in a location other than the electrolyte solution in the capacitor and is dissolved in the electrolyte solution.

DETAILED DESCRIPTION OF THE INVENTION

The electrolyte solution for use in an electrolytic capacitor of the invention is characterized in that a solvent with a high water concentration, comprising a mixture of an organic solvent and water, is used as the solvent for dissolution of the electrolyte, and in that a compound with an unsaturated bond-containing chain is dissolved or dispersed therein as the electrolyte solution.

As mentioned above, the organic solvent may be a protic solvent or an aprotic solvent alone, or any desired combination thereof. Alcohol compounds may be mentioned as examples of suitable protic solvents. As specific examples of alcohol compounds which may be advantageously used there may be mentioned those including but not limited to monohydric alcohols such as ethyl alcohol, propyl alcohol and butyl alcohol, dihydric alcohols (glycols) such as ethylene glycol, diethylene glycol, triethylene glycol and propylene glycol, and trihydric alcohols such as glycerin. Lactone compounds may be mentioned as examples of suitable aprotic solvents. As specific examples of lactone compounds which may be advantageously used there may be mentioned those including but not limited to γ-butyrolactone and other intramolecularly polarized compounds. More specifically, if one or more selected protic or aprotic solvents are used to carry out the invention, there may be used one protic solvent, one aprotic solvent, two or more different protic solvents, two or more different aprotic solvents or a mixture of one or more protic solvents with one or more aprotic solvents.

Water is also used with the organic solvent as a solvent component for the electrolyte solution of the invention and, according to the present invention, this is particularly distinct from conventional electrolyte solutions in that a relatively large amount of water is used. Using such a solvent for the invention lowers the solidifying point of the solvent thereby improving the resistivity of the electrolyte solution at low temperature and realizing satisfactory low temperature stability, as evidenced by a small difference between resistivities at low temperature and at ordinary temperature. The water content of the electrolyte solution is preferably in the range of 20-90 wt %, with the remainder consisting of the organic solvent. If the water content is below 20 wt % or above 90 wt %, the solidifying point of the electrolyte solution is insufficiently lowered, making it difficult to achieve satisfactory low temperature stability with the electrolytic capacitor. A more preferred water content of the aqueous solvent mixture has a lower limit of 40 wt %, more preferably 45.8 wt % and especially 50 wt % and an upper limit of 88.9 wt %, more preferably 85 wt % and especially 80 wt %.

The electrolyte used in the electrolyte solution of the invention is an organic acid, especially a carboxylic acid or its salt, or an inorganic acid or its salt, and such electrolyte components may be used alone or in combinations of 2 or more.

Examples of carboxylic acids which may be used as electrolyte components include, but are not limited to, monocarboxylic acids, dicarboxylic acids, tricarboxylic acids, hydroxyl group- and other functional group-containing carboxylic acids, saturated carboxylic acids and unsaturated carboxylic acids, such as formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, as well as their derivatives.

Examples of inorganic acids which may be used as electrolyte components include, but are not limited to, inorganic acids and alkyl group- or other carbon chain-containing inorganic acids, such as phosphoric acid, phosphorous acid, hypophosphorous acid, boric acid, sulfaminic acid and alkylphosphoric acids.

Any of various salts of the aforementioned carboxylic acids or inorganic acids may be used, and examples of suitable salts include ammonium salts, sodium salts, potassium salts, amine salts, alkylammonium salts, and the like. Ammonium salts are preferred among such salts.

Using an inorganic acid or its salt as the electrolyte when carrying out the invention can reduce the solidifying point of the electrolyte solution and therefore contribute to a further enhanced low temperature stability of the electrolyte solution. An inorganic acid or its salt is also of notable value in that its use can prolong the period of the hydrogen gas absorption of the compound with an unsaturated bond-containing chain.

According to research by the present inventors, the electrolyte consisting of such an inorganic acid or its salt may be used in combination with an electrolyte consisting of the aforementioned carboxylic acid or its salt in order to provide an effect which will notably extend the shelf-life of the electrolytic capacitor compared to using either electrolyte alone. Inorganic acids have conventionally been employed in conventional electrolytic capacitors of the medium- to high-voltage (160-500 volt) type due to problems involving conductivity, but when a combination electrolyte is used as according to the present invention, it may be advantageously used even in a low-voltage (<160 volt) type electrolytic capacitor.

The optimum amount of the electrolyte used in the electrolyte solution of the invention may be appropriately determined based on several factors including the properties required for the electrolyte solution and the final capacitor, the type, composition and amount of solvent used, and the type of electrolyte used. For example, when using a combination of an inorganic acid electrolyte with a carboxylic acid electrolyte as described above, the content of the inorganic acid electrolyte in the electrolyte mixture may be varied within a wide range, but in most cases the inorganic acid electrolyte will be present preferably in the range of about 0.1-15 wt % based on the total weight of the electrolyte.

The electrolyte solution of the invention is characterized by comprising a compound having an unsaturated bond-containing chain, particularly a solvent-soluble compound having an unsaturated bond-containing chain, in an electrolyte solution with the specific composition described above, i.e. an electrolyte solution which comprises a mixed solvent composed of 15-80 wt % of an organic solvent and 85-20 wt % water, and at least one type of electrolyte selected from the group consisting of carboxylic acids or their salts and inorganic acids or their salts. Solvent-soluble compounds with unsaturated bond-containing chains include compounds having a molecular chain with a carbon-carbon or carbon-nitrogen π bond, such as an alkyne, alkene or imine, with or without a substituent such as hydroxyl (OH), formyl (CHO), carbonyl (CO), sulfonyl ($SO_3H$), sulfinyl ($SO_2H$), sulfenyl (SOH), acyl (COR), carboxyl (COOH), amido ($CONH_2$), amino ($NH_2$), alkylamino (NHR), dialkylamino ($NR_2$), alkoxysilyl (SiOR), silanol (SiOH), phenylcarboxyl ($C_6H_5COOH$), nitrile (CN), nitro ($NO_2$), nitroso (NOH), phenol ($C_5H_5OH$), phosphono ($PO(OH)_2$), ester, ether or the like, as a non-limitative group of common substituents. For example, there may be mentioned acetylenecarboxylic acid, 2-propen-1-ol, 2-butene-1, 4-diol, p-formylbenzoic acid, methylvinyl ketone, allyl acetone, methylisopropenyl ketone, diallyl ketone, geranyl acetone, pseudomethylionone, maleic acid, acrylamide, alkylacrylamide, methacrylamide, crotonamide, oleic amide, monoallylamine, diallylamine, propargylamine, N-alkyl-N, N-bisamine, dialkyl(alkenyl)amine, 2-methoxy-4-(2-propenyl)phenol, 3-nitrostyrene, nitrocinnamic acid, 3-(2-nitrophenyl)-2-propionic acid, cinnamic acid esters, succinimide, dimethyleneimide, oxidophthalimide, glyoxime, acetaldehydeoxime, benzoinoxime, 2-butanoneoxime, vinyltrimethoxysilane, vinyltris(β-methoxyethoxy)silane and nitroacridine. According to the invention, the compound with an unsaturated bond-containing chain exhibits a more adequate effect if it is soluble in the electrolyte solvent.

Two or more different compounds with unsaturated bond-containing chains among those mentioned above may be used in combination for an enhanced effect.

The compound with an unsaturated bond-containing chain used in this case also has the function of inhibiting corrosion of printed boards by hydrochloric acid generated upon decomposition of halogenated hydrocarbons such as trichloroethane which are used for cleaning of the elements (i.e., it promotes hydrogen halide addition).

When the compound with an unsaturated bond-containing chain is added to the electrolyte solution of the invention, a specific composition which is effective for the effect of the invention is employed for the electrolyte solution itself and, therefore, satisfactory hydrogen gas-absorbing and hydrochloric acid sequestering effects may be exhibited with a single compound. It will usually be preferred for the compound with an unsaturated bond-containing chain to be added in an amount of 0.1-10 wt % based on the total weight of the electrolyte solution. If the amount added is less than 0.1 wt % it becomes almost impossible to achieve the desired effect, while no further increase in effect can be expected even if it is greater than 10 wt %, and instead the other properties such as precipitation may be adversely affected if the compound is of low solubility. A compound with an unsaturated bond-containing chain having excellent ion conductivity is highly useful as an electrolyte which can contribute to improved electrical properties of the electrolyte solution, and is therefore very effective even when added at high concentrations of up to 10 wt %. A more preferred concentration range is from 0.3 to 10 wt %.

The excellent effect of the invention for hydrogen gas absorption was confirmed in relation to electrolytes used in combination therewith. A method commonly employed in conventional electrolyte solutions is to add a gas absorbing agent such as a nitro compound to a carboxylic acid electrolyte alone or to an inorganic acid electrolyte alone. However, in cases of a high water content in the solvent, it has not been possible to obtain a satisfactory hydrogen gas-absorbing effect by this method. This has also been the case with electrolyte solutions comprising mixtures of carboxylic acid electrolytes and inorganic acid electrolytes. However, by using a compound with an unsaturated bond-containing chain in the electrolyte solution of the present invention, it is possible to maintain the hydrogen gas absorbing effects of such carboxylic acid/inorganic acid mixture electrolytes over significantly extended periods compared to conventional gas-absorbing additives.

The electrolyte solution of the invention may, if necessary, contain other components than those mentioned above, as additional additives. Examples of suitable additives include the following compounds which are mentioned in inventions separately applied for patenting by the present inventors in parallel with the present invention.

(1) Chelate compounds. For example, ethylenediamine tetraacetic acid (EDTA), trans-1,2-diaminocyclohexane-N,N, N',N'-tetraacetic acid hydrate (CyDTA), dihydroxyethylglycine (DHEG), ethylenediaminetetrakis (methylenephosphonic acid) (EDTPO), diethylenetriamine-N,N,N',N'',N''-pentaacetic acid (DPTA), diaminopropanoltetraacetic acid (DPTA-OH), ethylenediaminediacetic acid (EDDA), ethylenediamine-N,N'-bis(methylenephosphonic acid) hemihydrate (EDDPO), glycoletherdiaminetetraacetic acid (GEDTA), hydroxyethylethylenediaminetriacetic acid (EDTA-OH), and the like. It will generally be preferred for a chelating compound to be added in the range of 0.01-3 wt %. These chelate compounds are able to provide effects such as prolonging the usable life of low-impedance capacitors by inhibiting hydration of the aluminum (Al) electrode foils of the capacitors, as well as improving the low temperature stability (as the solvent has a nearly non-freezing composition, the change in impedance from ordinary temperature to low temperature is reduced) and improving the corrosion resistance of electrolytic capacitors.

(2) Saccharides. For example, glucose, fructose, xylose, galactose, and the like. It will generally be preferred for a saccharide to be added in the range of 0.01-5 wt %. These saccharides are able to provide effects such as prolonging the usable life of low-impedance capacitors by inhibiting hydration of the Al electrode foils of the capacitors, inhibiting decomposition or activation of the electrolyte, such as the carboxylic acid by the saccharide addition, and improving the low temperature stability of electrolytic capacitors (as the solvent has a nearly non-freezing composition, the change in impedance from ordinary temperature to low temperature is reduced).

(3) Hydroxybenzyl alcohols such as 2-hydroxybenzyl alcohol, L-glutamic acid diacetate or their salts. It will generally be preferred for such additives to be added in the range of 0.01-5 wt %. These additives are able to provide effects such as prolonging the usable life of low-impedance capacitors by inhibiting hydration of the Al electrode foils of the capacitors, and improving the low temperature stability of electrolytic capacitors (as the solvent has a nearly non-freezing composition, the change in impedance from ordinary temperature to low temperature is reduced).

The aforementioned compound groups (1) to (3) can each exhibit many notable effects when added to the electrolyte solution of the invention.

If necessary, the electrolyte solution of the invention may also contain the following additives in addition to those mentioned above.

(4) Gluconic acid or gluconic lactone, either alone or in combination. It will generally be preferred for such additives to be added in the range of 0.01-5 wt %. When added to the electrolyte solution of the invention, gluconic acid and gluconic lactone are able to further provide the notable effect of enhanced corrosion resistance in addition to the special effects of the invention of prolonged usable life of low-impedance capacitors, improved the low temperature stability and excellent hydrogen gas absorption.

(5) A nitro or nitroso compound may be added for further enhanced gas absorption. The added nitro or nitroso compound may be, for example, aminonitroanisole, aminonitrothiazolecarboxylic acid, aminonitrotoluene, aminonitropyridine, aminonitrophenol, aminonitrophenolsulfonic acid, aminonitrobenzenesulfonic acid, aminonitrobenzothiazole, aminonitrobenzotrifluoride, aminonitrobenzonitrile, nitrophenyl isocyanate, isonitrosoacetophenone, N-ethyl-2-(1-ethyl-2-hydroxy-2-nitrosohydrazino)ethaneamine, O-ethyl-O-(p-nitrophenyl)thionobenzene, ethylnitrobenzene, ethyl-2-(hydroxyimino)-5-nitro-3-hexeneamide, octanitrobenzoyl saccharose, nitrophenyloctyl ether, nitrophenylgalactopyranoside, 3-carboxy-4-nitrophenyl disulfide, bisnitrobenzylfluorescein, glycerol carbonate nitrobenzenesulfonate, glutamylnitroanilide, nitrophenyl acetate, nitrobenzylidene acetate, diaminonitrobenzene, dithiobisnitrobenzoic acid, dithiobisnitropyridine, dinitroaniline, dinitroquinoxaline-2,3-dione, dinitrosalicylic acid, nitrobenzoic acid, nitrophenol, dinitrobenzoic acid, nitroanisole, nitroacetophenone, dinitrodiphenylamine, dinitrodiphenylsulfone, dinitronaphtholsulfonic acid, dinitrobibenzyl, dinitrophenylaniline, dinitrophenylhydrazine, dinitrophenol, dinitrophthalic acid, dinitrofluorenone, dinitrofluorobenzene, dinitrobenzaldehyde, dinitrobenzoylmethylbenzylamine, dinitrobenzophenone, nitroaminothiazole, dithiobisnitropyridine, dimethylnitroaniline, dimethylnitrophenyl phosphorothioate, dimethoxynitrobenzyl alcohol, bisdinitrophenyl oxalate, succinimidyl nitrophenylacetate, tetranitrophenylporphyrin, trinitrophenol, trinitrobenzenesulfonic acid, nitroacetanilide, nitroazobenzenediol, nitroanisidine, nitroaniline, nitroanilinesulfonic acid, nitroaminoanisole, nitroaminotoluene, nitroaminophenol, nitroarginine, ethyl nitrobenzoate, methyl nitrobenzoate, nitroanthranilic acid, nitroanthranilonitrile, nitroisatin, nitroimidazole, nitroindazole, 2-nitroindan-1,3-dione, nitroindole, nitrouracil, nitroethanol, nitroethylbenzene, nitrocatechol, nitroquipazine maleate, nitrocresol, nitrocinnamic acid, nitrosalicylic acid, nitrodiazoaminoazobenzene, nitrodiaminobenzene, nitrodiphenylamine, nitrodimethylaniline, nitrosulfonazo III, nitrothiophene, nitrotyrosine, nitroterephthalic acid, nitrotoluidine, nitrotoluic acid, nitropicoline, nitrohydroxyaniline, nitrobiphenyl, nitropiperonal, nitropyridinol, nitrobarbituric acid, nitrophenylacetonitrile, nitrophenylazoorcinol, nitrophenylazonaphthol, nitrophenylazomethylresorcinol, nitrophenylaniline, nitrophenyloctyl ether, nitrophenylgalactopyranoside, nitrophenylxylopyranoside, nitrophenylglucuronide, nitrophenylglucopyranoside, nitrophenylacetic acid, nitrophenyldodecyl ether, nitrophenylarsonic acid, nitrophenylhydrazine, nitrophenylphenylazophenyltriazene, nitrophenylphenyl ether, nitrophenylmaltopentaoside, nitrophenylmannopyranoside, nitrophenylbutyric acid, diethyl nitrophenylphosphate, nitrophenylenediamine, nitrophenetole, nitrophenolarsonic acid, nitrophenolmethyl ether, nitrophthalimide, nitrophthalic acid, nitrohumic acid, nitropropionic acid, nitroveratryl alcohol, nitrobenzylamine, nitrobenzyl alcohol, nitrobenzyldiisopropylisourea, nitrobenzylpyridine, nitrobenzamide, nitrobenzimidazole, nitrobenzhydrazide, nitrobenzeneazoorcin, nitrobenzeneazonaphthol, nitromethane, nitroethane, nitrobenzeneazoresorcin, nitrobenzenesulfonic acid, nitrobenzocoumarin, nitrobenzonitrile, nitrobenzophenone, nitromesitylene, nitromethoxyaniline, bisnitrophenyldisulfide, bisnitrophenylsulfone, bismethylthionitroethene, hydroxynitrobenzoic acid, hydroxynitrotoluene, hydroxynitropyridine, hydroxynitrophenylarsonic acid, hydroxynitrobenzaldehyde, phenylnitroaniline, 2-(2-furyl)-3-(5-nitro-2-furyl)acrylamide, fluoronitroacetanilide, fluoronitroaniline, fluoronitrophenylazide, fluoronitrophenol, methylnitroaniline, methylnitrophenol, methylnitropyridine, methylnitropyridine oxide, methoxynitroaniline, methoxynitrobenzoic acid, methoxynitrophenol, methoxybenzylaminonitrobenzofurazan, nitrophenyl butyrate, nitronium tetrafluoroborate, nitrophenyl phosphate, nitrosoacetylpenicillamine, nitroso(acetoxymethyl)methylamine, nitrosooxine, nitrosoquinolinol, nitrosoglutathione, nitrosodiisobutylamine, nitrosodiethylamine, nitrosodiethylaniline, nitrosodisulfonic acid, nitrosodiphenylamine, nitrosodimethylamine, nitrosonaphthol, nitrosonaphtholdisulfonic acid, nitrosohydroxyquinoline, nitrosophenylaniline, nitrosophenylhydroxylamine ammonium, nitrosophenol, N-[(N-nitrosomethylamino)methyl]benzamide, 2,2'-(hydroxynitrosohydrazono)bisethaneamine, isonitrosoacetophenone, N-methyl-2-(1-ethyl-2-hydroxy-2-nitrosohydrazino)ethaneamine, N,N'-dinitroso-p-phenylenediamine, N,N'-dinitrosopentamethylenetetramine, dimethylnitrosoaniline, dimethylnitrosoamine, nitrosonium tetrafluoroborate, N-[N'-methyl-N'-nitroso(aminomethyl)]benzamide, N-methyl-N-nitroso-p-toluenesulfonamide, nitrobenzene, dinitrobenzene, dinitrotoluene, nitronaphthalene, dinitronaphthalene, dinitrobiphenyl, nitrodiphenylamine, nitrophenylhydrazine, dimethylnitrotoluene, dinitrophenylhydrazine, dinitropyrene, nitrobenzoic acid esters, dimethylnitrobenzene, nitroanthracene, nitroisoquinoline, nitroxylene, ethyl nitroacetate, nitrocyclopentane, nitrostyrene, nitropyrrole, nitrofurazone, nitrofuraldehyde, nitrohexane, nitrobenzaldehyde, nitrolignin, 2-(2-furyl)-3-(5-nitro-2-furyl)acrylamide, nitroacrylamide, fluoronitrotoluene, fluoronitrobenzene and fluorodiphenyl ether, as well as their isomers, salts and derivatives.

Besides the additives mentioned above, there may also be included additives which are commonly used in the field aluminum electrolytic capacitors or other types of electrolytic capacitors. As examples of suitable commonly used additives there may be mentioned mannite, silane coupling agents, water-soluble silicone, polymer electrolytes and the like. The electrolyte solution of the invention may be prepared by combining and dissolving the various components described above in any desired order, and basically conventional techniques may be used, either with or without modifications. For example, a simple method involves preparation of a solvent as a mixture of an organic solvent and water with a high water concentration, followed by dissolution of the electrolyte, the compound with an unsaturated bond-containing chain and desired additives as necessary in the resulting solvent.

The electrolyte solution of the invention may be prepared according to ordinary techniques similar to the electrolyte solution described above. For example, an aluminum electrolytic capacitor may be manufactured by impregnating the electrolyte solution of the invention into an element that has been constructed by using an anode foil and cathode foil both composed of dielectric oxide films formed to prescribed thicknesses, setting the anode foil and cathode foil opposing each other and setting a separator between them, and then packaging the element by an appropriate method. Because the obtained aluminum electrolytic capacitor employs the electrolyte solution of the invention, it is able to exhibit an effect of improved low temperature stability due to the mixed solvent of the organic solvent and water and hydrogen gas absorption due to the presence of the compound with an unsaturated bond-containing chain, as well as effects of prolonged usable life and low impedance as a result of inhibited hydration reaction due to the use of specific electrolytes.

It was confirmed that according to the invention, an adequate hydrogen-adsorbing is exhibited even if the compound with an unsaturated bond-containing chain is physically present not in the electrolyte solution but in the hydrogen-generating section, i.e. in the form of a film or the like on the electrode surface or its proximity, or in the separator. A significant effect is also exhibited if the compound with an unsaturated bond-containing chain is attached to the inner surface of the capacitor case.

For example, the compound with an unsaturated bond-containing chain may be dissolved in an appropriate solvent, and is adhered by coating the resulting solution onto the electrodes (foils or electrode tabs) or the separator or else by immersing the electrodes (foils or electrode tabs) or separator in the solution. The amount of adhesion may be an amount at least sufficient to exhibit an effect when the compound with an unsaturated bond-containing chain is dissolved in the electrolyte solution, or at least 0.1% calculated for the electrolyte solution, and optimally 0.01 mg/cm$^2$ to 1 mg/cm$^2$ (projectional area). The capacitor fabricated in this manner can achieve an effect of hydrogen gas absorption, as well as effects of prolonged usable life and low impedance as a result of inhibited hydration reaction due to the use of specific electrolytes.

According to another aspect of the invention, based on the experimental findings and results described above, there is provided an electrolytic capacitor which comprises an electrolytic capacitor composing an electrolyte solution according to the invention, and a compound with an unsaturated bond-containing chain inside the capacitor.

Figure 1:
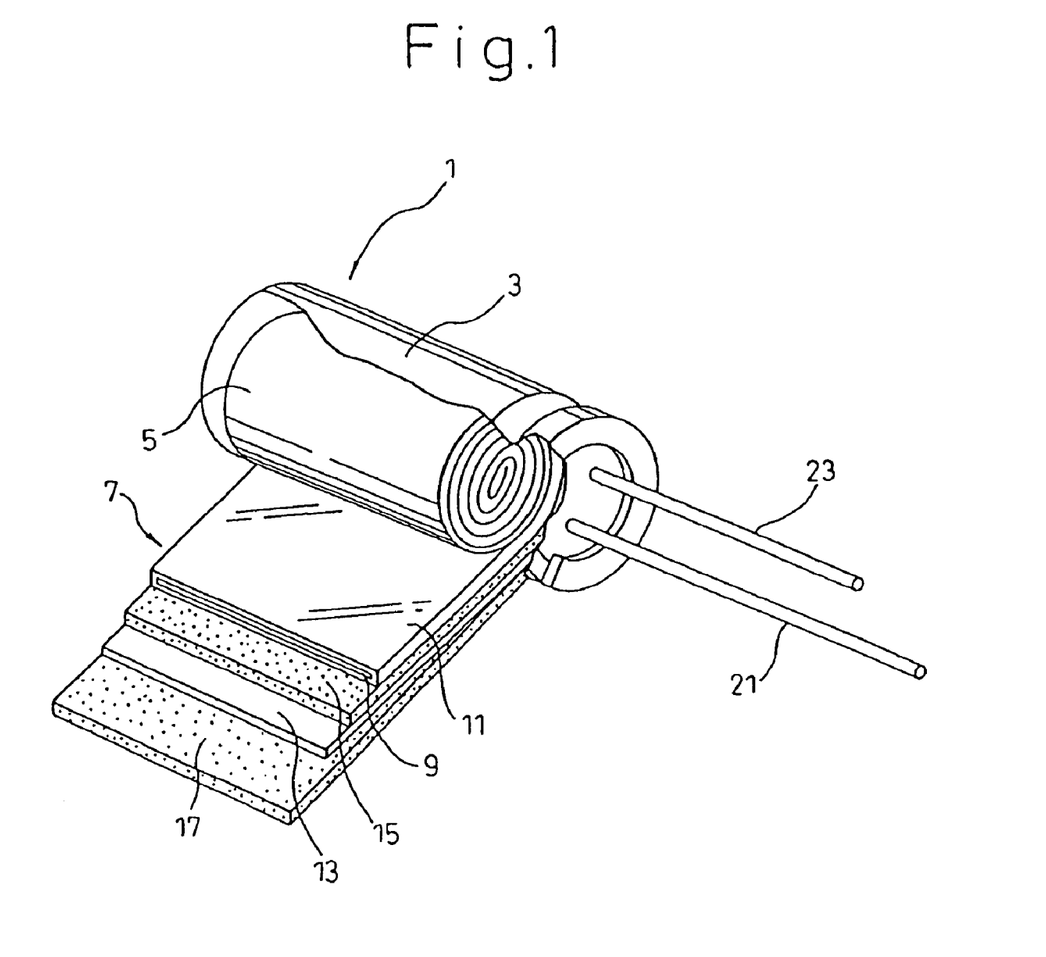
FIG. 1 is a schematic drawing of an electrolytic capacitor.

There are no particular restrictions on the structure and shape of the electrolytic capacitor employing the electrolytic capacitor electrolyte solution of the invention, but the following brief explanation will be based on a specific embodiment with reference to FIG. 1. The capacitor 1 comprises an aluminum case 3 and a wound element 5 housed inside the aluminum case 3. The element 5 in turn comprises an anode foil 9 composed of aluminum foil having a surface dielectric film 11 formed by anode oxidation, an aluminum cathode foil 13 opposing the surface dielectric film 11 of the anode foil 9, and a separator 15 between the anode foil 11 and cathode foil 13. The laminate 7 is impregnated with an electrolyte solution of the invention. The laminate 7 is wound together with another separator 17 to form the wound element 15, which is placed inside the case 3. In FIG. 1, an anode lead wire 21 and cathode lead wire 23 are connected respectively to the anode foil 11 and cathode foil 13 via lead tabs (not shown). The electrolytic capacitor of the invention employs an electrolytic capacitor electrolyte solution according to the invention.

EXAMPLES

The present invention will now be explained in greater detail through examples, with the understanding that these examples serve merely as illustrations of the invention and are in no way limitative.

The 30° C. resistivity values of the electrolyte solutions used in the examples were measured and are listed in the accompanying tables. The low-temperature (−40° C.) impedance and ordinary temperature (20° C.) impedance of the fabricated electrolytic capacitors were measured, and then the impedance ratio (Z ratio) as the ratio of the measured values was calculated for measurements at different frequencies (120 Hz and 100 kHz), as shown in the tables for each of the examples. In order to evaluate the usable life properties of each of the electrolytic capacitors, the initial values for the capacitance, tan δ and leakage current (values immediately after fabrication of each capacitor) and the change in those values after a high-temperature load test by standing for a prescribed period under conditions of 105° C. with application of rated voltage, were determined and are shown in the tables for each of the examples.

Examples 1-12

After impregnating a wound element of an electrolytic capacitor (10 WV-1000 µF) with an electrolyte solution having the composition shown in Table 1 below, it was placed in an aluminum case with the electrode drawing lead tab extending out of the case, and then the opening of the case was sealed with an elastic sealant to fabricate an electrolytic capacitor. Examples 1 to 10 were conducted to examine the effects of chelate compounds, saccharides, hydroxybenzyl alcohol, L-glutamic acid diacetate or its salt and gluconic acid and gluconic lactone. In Examples 11 and 12, there were fabricated capacitors under conditions with the compound having an unsaturated bond-containing chain electrode either coated onto the foils or adhered to the separator. The capacitors were subjected to characteristic testing, and the obtained results are summarized in Table 1 below.

Comparative Examples 1-3

The procedure of Example 1 above was repeated, but for the comparative examples the compound with an unsaturated bond-containing chain was eliminated from the electrolyte solution and the composition of each electrolyte solution was changed as shown in Table 1. The results of characteristic testing are also summarized in Table 1.

TABLE 1

|  |  | Electrolyte solution composition [wt %] |  | Specific resistance 30° C. [Ω · cm] | Z ratio ||
|---|---|---|---|---|---|---|
|  |  |  |  |  | 120 Hz [−40/20° C.] | 100 kHz [−40/20° C.] |
| Comp. Ex. 1 | Ethylene glycol |  | 60.0 | 68 | 1.0 | 12.5 |
|  | Water |  | 30.0 |  |  |  |
|  | Ammonium glutarate |  | 9.5 |  |  |  |
|  | Hypophosphorous acid |  | 0.5 |  |  |  |
| Comp. Ex. 2 | Ethylene glycol |  | 45.0 | 42 | 1.0 | 7.0 |
|  | Water |  | 38.0 |  |  |  |
|  | Ammonium adipate |  | 14.0 |  |  |  |
|  | Phosphoric acid |  | 1.0 |  |  |  |
|  | Glycine |  | 1.0 |  |  |  |

TABLE 1-continued

| | Component | Amount | | | |
|---|---|---|---|---|---|
| Comp. Ex. 3 | Ethylene glycol | 30.0 | 23 | 1.1 | 6.0 |
| | Water | 50.0 | | | |
| | Ammonium adipate | 18.0 | | | |
| | Phosphorous acid | 1.5 | | | |
| | Xylose | 0.5 | | | |
| Comp. Ex. 4 | Ethylene glycol | 10.0 | 15 | 5.8 | 34.0 |
| | Water | 80.0 | | | |
| | Ammonium formate | 4.0 | | | |
| | Phosphoric acid | 1.0 | | | |
| | Ethylenediaminetetraacetic acid | 1.0 | | | |
| Example 1 | Ethylene glycol | 10.0 | 16 | 5.2 | 33.2 |
| | Water | 80.0 | | | |
| | Ammonium formate | 4.0 | | | |
| | Phosphoric acid | 1.0 | | | |
| | trans-2-Butene-1,4-di carboxylic acid | 4.0 | | | |
| | Ethylenediaminetetraacetic acid | 1.0 | | | |
| Example 2 | Ethylene glycol | 45.0 | 28 | 1.1 | 5.3 |
| | Water | 38.0 | | | |
| | Ammonium adipate | 14.0 | | | |
| | Phosphoric acid | 1.0 | | | |
| | Ammonium hydrogen maleate | 1.0 | | | |
| | Glycine | 1.0 | | | |
| Example 3 | Ethylene glycol | 15.0 | 25 | 2.2 | 5.7 |
| | Water | 60.0 | | | |
| | Ammonium adipate | 24.2 | | | |
| | Ammonium hydrogen fumarate | 2.0 | | | |
| | Hypophosphorous acid | 1.0 | | | |
| Example 4 | Ethylene glycol | 30.0 | 32 | 1.2 | 5.5 |
| | Water | 50.0 | | | |
| | Ammonium adipate | 18.0 | | | |
| | Phosphorous acid | 1.5 | | | |
| | Ammonium hydrogen maleate | 2.0 | | | |
| | Xylose | 0.5 | | | |
| Example 5 | Ethylene glycol | 60.0 | 70 | 1.0 | 9.7 |
| | Water | 30.0 | | | |
| | Ammonium glutarate | 9.5 | | | |
| | Hypophosphorous acid | 0.5 | | | |
| | Cinnamic acid | 4.0 | | | |
| Example 6 | Ethylene glycol | 5.0 | 18 | 8.9 | 145.0 |
| | Water | 90.0 | | | |
| | Ammonium adipate | 4.0 | | | |
| | L-Glutamic acid diacetate | 0.4 | | | |
| | Sodium hydrogen maleate | 1.2 | | | |
| | Hypophosphorous acid | 0.3 | | | |
| Example 7 | Ethylene glycol | 20.0 | 26 | 1.1 | 4.8 |
| | Water | 60.0 | | | |
| | Ammonium glutarate | 16.0 | | | |
| | Fructose | 1.0 | | | |
| | α-Picolinic acid | 0.8 | | | |
| | Sulfamic acid | 0.6 | | | |
| Example 8 | Ethylene glycol | 12.0 | 25 | 2.8 | 8.3 |
| | Water | 68.0 | | | |
| | Ammonium adipate | 23.8 | | | |
| | trans-2-Butene-1,4-di carboxylic acid | 2.0 | | | |
| | Gluconic lactone | 0.5 | | | |
| | Phosphoric acid | 1.0 | | | |
| Example 9 | Ethylene glycol | 25.0 | 30 | 1.3 | 5.6 |
| | Water | 50.0 | | | |
| | Ammonium adipate | 22.0 | | | |
| | Benzenesulfonic acid | 5.0 | | | |
| | Vinyltrimethoxysilane | 1.0 | | | |
| | Ethylenediaminetetraacetic acid | 1.0 | | | |
| Example 10 | Ethylene glycol | 55.0 | 80 | 1.0 | 6.0 |
| | Water | 20.0 | | | |
| | Ammonium adipate | 15.0 | | | |
| | Boric acid | 5.0 | | | |
| | Acetaldehyde oxime | 1.0 | | | |
| | Hydroxybenzyl alcohol | 1.0 | | | |
| Example 11 | Electrode foils immersed in oleic amide-containing ethanol solution to adhere oleic amide to the surface at 0.5 mg/cm², and then capacitor element was fabricated and impregnated with electrolyte solution. | | 68 | 1.0 | 8.9 |
| | Ethylene glycol | 60.0 | | | |
| | Water | 30.0 | | | |
| | Ammonium glutarate | 9.5 | | | |
| | Hypophosphorous acid | 0.5 | | | |

TABLE 1-continued

| | | | | |
|---|---|---|---|---|
| Example 12 | Element prior to impregnation with electrolyte solution was immersed in benzoinoxime-containing ethanol solution and then dried to include it inside the element, and then the element was impregnated with the electrolyte solution. | 42 | 1.0 | 5.3 |
| | Ethylene glycol | 45.0 | | |
| | Water | 38.0 | | |
| | Ammonium adipate | 14.0 | | |
| | Phosphoric acid | 1.0 | | |
| | Glycine | 1.0 | | |

| | Initial values | | | Values after 1000 hrs at 105° C | | | |
|---|---|---|---|---|---|---|---|
| | Capacitance [μF] | tanδ [%] | Leakage current [μA] | Capacitance [μF] | tanδ [%] | Leakage current [μA] | Appearance (behavior) |
| Comp. Ex. 1 | 1007 | 7.0 | 6.5 | All safety vents activated by 250 hours due to gas generation. | | | |
| Comp. Ex. 2 | 1016 | 6.2 | 6.1 | All safety vents activated by 500 hours due to gas generation. | | | |
| Comp. Ex. 3 | 1025 | 5.1 | 6.9 | All safety vents activated by 250 hours due to gas generation. | | | |
| Comp. Ex. 4 | 1029 | 4.5 | 6.5 | All safety vents activated by 100 hours due to gas generation. | | | |
| Example 1 | 1025 | 4.7 | 7.9 | 925 | 5.7 | 3.7 | |
| Example 2 | 1038 | 5.5 | 8.9 | 930 | 6.8 | 4.2 | |
| Example 3 | 1040 | 5.1 | 7.9 | 934 | 6.3 | 3.2 | |
| Example 4 | 1020 | 5.3 | 8.2 | 940 | 6.1 | 3.5 | |
| Example 5 | 1015 | 6.2 | 7.5 | 952 | 6.9 | 2.1 | |
| Example 6 | 1028 | 4.5 | 7.3 | 908 | 5.3 | 2.9 | Freezing at −40° C. |
| Example 7 | 1030 | 4.9 | 6.9 | 917 | 5.2 | 2.8 | |
| Example 8 | 1035 | 5.5 | 7.3 | 938 | 6.7 | 3.3 | |
| Example 9 | 1010 | 6.5 | 8.5 | 950 | 7.8 | 4.2 | |
| Example 10 | 1005 | 6.7 | 7.2 | 952 | 7.6 | 2.4 | |
| Example 11 | 1007 | 7.0 | 6.5 | 944 | 7.7 | 2.2 | |
| Example 12 | 1016 | 6.2 | 6.1 | 956 | 7.4 | 3.1 | |

The electrolytic capacitors employing electrolyte solutions of the invention exhibited low Z ratios, and particularly low Z ratios compared to the comparative examples at the higher frequency of 100 kHz. This indicates that the electrolytic capacitors employing electrolyte solutions of the invention exhibit satisfactory low temperature stability in a wide frequency range. In particular, the electrolytic capacitors employing electrolyte solutions of the invention exhibited stable characteristics even after 1000 hours at 105° C. due to addition of compounds with unsaturated bond-containing chains to the electrolyte solutions in amounts in the range of 0.1-10 wt %, and there was no capacitor rupture or abnormal characteristics due to generation of gas. In contrast, all of the electrolytic capacitors of the comparative examples, employing electrolyte solutions containing no compounds with unsaturated bond-containing chains, were unusable because the safety vents were activated as a result of hydrogen gas generation-induced swelling of the cases, even at the initial stage of high-temperature load and long before 1000 hours had expired. This demonstrated that an extended usable life can be easily achieved for an electrolytic capacitor according to the invention.

Examples 13-22

The procedure of Example 1 above was repeated, but in order to confirm the effects of simultaneously adding a nitro compound or nitroso compound with the chelate compounds, saccharides, hydroxybenzyl alcohol, L-glutamic acid diacetate or its salt or gluconic acid and gluconic lactone, the optional compositions added to the electrolyte solutions were varied for these examples as shown in Table 2. The test results are also summarized in Table 2.

TABLE 2

| | | | | Z ratio | |
|---|---|---|---|---|---|
| | | | Specific resistance 30° C. [Ω · cm] | 120 Hz [−40/20° C.] | 100 kHz [−40/20° C.] |
| | Electrolyte solution composition [wt %] | | | | |
| Example 13 | Ethylene glycol | 30.0 | 20 | 1.1 | 4.6 |
| | Water | 50.0 | | | |
| | Ammonium formate | 6.0 | | | |
| | Ammonium adipate | 5.0 | | | |
| | Phosphoric acid | 1.0 | | | |
| | Ethylenediaminetetraacetic acid | 0.5 | | | |
| | Nitrobenzoic acid | 1.0 | | | |
| | Ammonium hydrogen maleate | 2.0 | | | |

TABLE 2-continued

| | | | | | |
|---|---|---|---|---|---|
| Example 14 | Ethylene glycol | 40.0 | 35 | 1.1 | 5.2 |
| | Water | 40.0 | | | |
| | Ammonium glutarate | 16.2 | | | |
| | Hypophosphorous acid | 2.0 | | | |
| | Gluconic lactone | 0.2 | | | |
| | Nitrophenol | 1.0 | | | |
| | α-Picolinic acid | 1.5 | | | |
| Example 15 | Ethylene glycol | 20.0 | 18 | 1.3 | 4.9 |
| | Water | 60.0 | | | |
| | Ammonium adipate | 21.8 | | | |
| | Phosphoric acid | 1.0 | | | |
| | Dinitrobenzoic acid | 0.5 | | | |
| | trans-2-Butene-1,4-di carboxylic acid | 1.5 | | | |
| Example 16 | Ethylene glycol | 12.0 | 20 | 3.5 | 20.0 |
| | Water | 80.0 | | | |
| | Ammonium adipate | 4.0 | | | |
| | Phosphoric acid | 1.0 | | | |
| | Nitrobenzoic acid | 1.0 | | | |
| | Ammonium hydrogen fumarate | 1.0 | | | |
| Example 17 | Ethylene glycol | 50.0 | 75 | 1.0 | 5.7 |
| | Water | 25.0 | | | |
| | Ammonium adipate | 13.0 | | | |
| | Boric acid | 8.0 | | | |
| | Cinnamic acid | 2.0 | | | |
| | Phosphoric acid | 0.2 | | | |
| | Nitrophthalic acid | 0.5 | | | |
| Example 18 | Ethylene glycol | 50.0 | 60 | 1.4 | 5.3 |
| | Water | 30.0 | | | |
| | Ammonium glutarate | 6.0 | | | |
| | Ammonium sulfamate | 12.0 | | | |
| | Hypophosphorous acid | 1.0 | | | |
| | Nitrosoquinolinol | 0.5 | | | |
| | Vinyltriethoxysilane | 1.0 | | | |
| Example 19 | Ethylene glycol | 23.0 | 16 | 1.1 | 5.0 |
| | Water | 65.0 | | | |
| | Ammonium formate | 5.0 | | | |
| | Hypophosphorous acid | 0.4 | | | |
| | Ethylenediaminetetraacetic acid | 0.5 | | | |
| | Dinitrobenzoic acid | 0.5 | | | |
| | Gluconic lactone | 0.2 | | | |
| | Ammonium hydrogen maleate | 1.2 | | | |
| Example 20 | Ethylene glycol | 60.0 | 85 | 1.0 | 6.0 |
| | Water | 20.0 | | | |
| | Ammonium adipate | 10.0 | | | |
| | Boric acid | 8.0 | | | |
| | Acetaldehyde oxime | 1.0 | | | |
| | Phosphoric acid | 0.5 | | | |
| | Nitrobenzoic acid | 0.3 | | | |
| Example 21 | Ethylene glycol | 45.0 | 55 | 1.0 | 5.2 |
| | Water | 30.0 | | | |
| | Ammonium adipate | 20.0 | | | |
| | Boric acid | 4.0 | | | |
| | Acetaldehyde oxime | 1.0 | | | |
| | Nitrophenol | 0.9 | | | |
| Example 22 | Ethylene glycol | 30.0 | 73 | 1.1 | 5.3 |
| | Water | 55.0 | | | |
| | Ammonium glutarate | 15.0 | | | |
| | Nitrobenzoic acid | 0.4 | | | |
| | Benzoin oxime | 1.0 | | | |
| | Hypophosphorous acid | 1.0 | | | |

| | Initial values | | | Values after 3000 hrs at 105° C | | | |
|---|---|---|---|---|---|---|---|
| | Capacitance [μF] | tanδ [%] | Leakage current [μA] | Capacitance [μF] | tanδ [%] | Leakage current [μA] | Appearance (behavior) |
| Example 13 | 1035 | 4.3 | 8.2 | 895 | 5.6 | | 2.7 |
| Example 14 | 1034 | 5.1 | 7.9 | 900 | 5.9 | | 2.6 |
| Example 15 | 1015 | 5.8 | 8.5 | 890 | 6.9 | | 3.2 |
| Example 16 | 1021 | 4.1 | 7.8 | 919 | 5.2 | | 3.1 |
| Example 17 | 1014 | 6.6 | 6.8 | 943 | 7.2 | | 2.5 |
| Example 18 | 1021 | 8.2 | 8.6 | 962 | 9.6 | | 2.7 |
| Example 19 | 1035 | 4.2 | 7.1 | 897 | 5.0 | | 2.8 |
| Example 20 | 1014 | 5.7 | 6.1 | 911 | 6.5 | | 2.9 |
| Example 21 | 1014 | 5.7 | 6.1 | 911 | 6.5 | | 2.9 |
| Example 22 | 1010 | 8.5 | 7.2 | 895 | 9.6 | | 2.4 |

As clearly shown by the results in Table 2, the capacitors of Examples 13 to 22 exhibited satisfactory characteristics and low gas generation after 3,000 hours.

Preferred examples of the invention have been described above, but the invention is not limited to the descriptions in these examples or the claims, and various improvements may be incorporated therein within the spirit of the invention. For example, wound capacitor elements were used in the aforementioned examples, but the same advantages may be obtained with laminated capacitor elements.

According to the present invention there is provided an electrolyte solution for use in an electrolytic capacitor having low impedance and excellent low temperature stability, as represented by the impedance ratio at low temperature and ordinary temperature, and a satisfactory usable life, and also being capable of exhibiting an excellent hydrogen gas-absorbing effect even when an electrolyte solution employing a solvent mixture with a high water content is used or when the electrolytic capacitor is used in a high-temperature environment. The invention further provides an electrolytic capacitor, particularly an aluminum electrolytic capacitor, which employs the electrolyte solution and is therefore highly reliable, with low impedance excellent low temperature stability, a satisfactory usable life and no inconveniences caused by the action of the water used in the solvent.

The invention claimed is:

1. An electrolytic capacitor comprising a compound having an unsaturated carbon-carbon or carbon-nitrogen $\pi$ bond containing chain which undergoes hydrogen addition reaction and an electrolyte solution comprising a solvent composed of 10-80 wt % of an organic solvent, 90-20 wt % water and at least one type of electrolyte selected from the group consisting of carboxylic acids or their salts or inorganic acids or their salts; wherein the compound having the carbon-carbon or carbon-nitrogen $\pi$ bond containing chain which undergoes hydrogen addition reaction comprises an alkyne, alkene or imine compound, and at least one substituent selected from the group consisting of hydroxyl, formyl, carbonyl, acyl, carboxyl, sulfonyl, sulfinyl, sulfenyl, amido, amino, alkylamino, dialkylamino, alkoxysilyl, silanol, phenylcarboxyl, nitrile, nitro, nitroso, phenol, phosphono, esters and ethers.

2. An electrolytic capacitor according to claim 1, employing an electrolyte solution comprising a solvent composed of 10-80 wt % of an organic solvent and 90-20 wt % water, and having the compound with an unsaturated carbon-carbon or carbon-nitrogen it bond containing chain which undergoes hydrogen addition reaction present on an electrode surface.

3. An electrolytic capacitor according to claim 2, wherein the compound with an unsaturated carbon-carbon or carbon-nitrogen it bond containing chain which undergoes hydrogen addition reaction is adhered to or thoroughly permeated into the electrode surface by coating of or immersion in a solution of the unsaturated compound.

4. An electrolytic capacitor according to claim 1, employing an electrolyte solution comprising a solvent composed of 15-80 wt % of an organic solvent and 85-20 wt % water, and having the compound with an unsaturated carbon-carbon or carbon-nitrogen $\pi$ bond containing chain which undergoes hydrogen addition reaction present on an electrode surface.

5. An electrolytic capacitor according to claim 1, employing an electrolyte solution comprising a solvent composed of 10-80 wt % of an organic solvent and 90-20 wt % water, and including the compound with an unsaturated carbon-carbon or carbon-nitrogen $\pi$ bond containing chain which undergoes hydrogen addition reaction in a separator of the electrolytic capacitor.

6. An electrolytic capacitor according to claim 5, wherein the compound with an unsaturated carbon-carbon or carbon-nitrogen it bond containing chain which undergoes hydrogen addition reaction is adhered to or thoroughly permeated into the separator by coating of or immersion in a solution of the unsaturated compound.

7. An electrolytic capacitor according to claim 1, employing an electrolyte solution comprising a solvent composed of 15-80 wt % of an organic solvent and 85-20 wt % water, and including the compound with an unsaturated carbon-carbon or carbon-nitrogen it bond containing chain which undergoes hydrogen addition reaction in a separator of the electrolytic capacitor.

8. An electrolytic capacitor according to claim 1, wherein the content of the compound with an unsaturated carbon-carbon or carbon-nitrogen $\pi$ bond containing chain which undergoes hydrogen addition reaction in an electrode foil is 0.01 mg/cm$^2$ to 1 mg/cm$^2$ (projectional area).

9. An electrolytic capacitor according to claim 1, wherein the content of the compound with an unsaturated carbon-carbon or carbon-nitrogen $\pi$ bond containing chain which undergoes hydrogen addition reaction in a separator is 0.01 mg/cm$^2$ to 1 mg/cm$^2$ (projectional area).

10. An electrolytic capacitor comprising a compound having an unsaturated carbon-carbon or carbon-nitrogen $\pi$ bond containing chain which undergoes hydrogen addition reaction and an electrolyte solution comprising a solvent composed of 15-80 wt % of an organic solvent, 85-20 wt % water and at least one type of electrolyte selected from the group consisting of carboxylic acids or their salts or inorganic acids or their salts; wherein the compound having the carbon-carbon or carbon-nitrogen $\pi$ bond containing chain which undergoes hydrogen addition reaction comprises an alkyne, alkene or imine compound, and at least one substituent selected from the group consisting of hydroxyl, formyl, carbonyl, acyl, carboxyl, sulfonyl, sulfinyl, sulfenyl, amido, amino, alkylamino, dialkylamino, alkoxysilyl, silanol, phenylcarboxyl, nitrile, nitro, nitroso, phenol, phosphono, esters and ethers.

11. An electrolytic capacitor according to claim 10, employing an electrolyte solution comprising a solvent composed of 15-80 wt % of an organic solvent and 85-20 wt % water, and having the compound with an unsaturated carbon-carbon or carbon-nitrogen $\pi$ bond containing chain which undergoes hydrogen addition reaction present on an electrode surface.

12. An electrolytic capacitor according to claim 10, employing an electrolyte solution comprising a solvent composed of 15-80 wt % of an organic solvent and 85-20 wt % water, and including the compound having an unsaturated carbon-carbon or carbon-nitrogen $\pi$ bond containing chain which undergoes hydrogen addition reaction in a separator of the electrolytic capacitor.

13. An electrolyte capacitor according to claim 10, wherein the content of the compound with an unsaturated carbon-carbon or carbon-nitrogen $\pi$ bond containing chain which undergoes hydrogen addition reaction in an electrode foil is 0.01 mg/cm$^2$ to 1 mg/cm$^2$ (projectional area).

14. An electrolyte capacitor according to claim 10, wherein the content of the compound with an unsaturated carbon-carbon or carbon-nitrogen $\pi$ bond containing chain which undergoes hydrogen addition reaction in a separator is 0.01 mg/cm$^2$ to 1 mg/cm$^2$ (projectional area).

* * * * *

UNITED STATES PATENT AND TRADEMARK OFFICE
CERTIFICATE OF CORRECTION

| | | |
|---|---|---|
| PATENT NO. | : 7,660,101 B2 | Page 1 of 1 |
| APPLICATION NO. | : 11/729052 | |
| DATED | : February 9, 2010 | |
| INVENTOR(S) | : Komatsu et al. | |

It is certified that error appears in the above-identified patent and that said Letters Patent is hereby corrected as shown below:

Title page, (30) Foreign Application Priority Data: Insert omitted foreign priority as follows --Dec. 28, 2001   (JP)   2001-401204--

Signed and Sealed this

Thirty-first Day of August, 2010

David J. Kappos
*Director of the United States Patent and Trademark Office*